US008968646B2

(12) United States Patent
Matheis et al.

(10) Patent No.: US 8,968,646 B2
(45) Date of Patent: Mar. 3, 2015

(54) SYNERGISTIC METHODS FOR ODOR CONTROL

(75) Inventors: Timothy F. Matheis, Palmetto, FL (US); David L. Morano, Sarasota, FL (US); James P. Harshman, Bradenton, FL (US)

(73) Assignee: Evoqua Water Technologies LLC, Warrendale, PA (US)

( * ) Notice: Subject to any disclaimer, the term of this patent is extended or adjusted under 35 U.S.C. 154(b) by 326 days.

(21) Appl. No.: 13/400,997

(22) Filed: Feb. 21, 2012

(65) Prior Publication Data

US 2012/0213662 A1    Aug. 23, 2012

Related U.S. Application Data

(60) Provisional application No. 61/444,190, filed on Feb. 18, 2011.

(51) Int. Cl.
| | | |
|---|---|---|
| *A61L 9/00* | (2006.01) | |
| *C02F 1/76* | (2006.01) | |
| *A62B 7/08* | (2006.01) | |
| *B01D 46/46* | (2006.01) | |
| *B01D 53/30* | (2006.01) | |
| *C02F 1/68* | (2006.01) | |
| *C02F 1/70* | (2006.01) | |
| *C02F 1/72* | (2006.01) | |
| *C02F 101/10* | (2006.01) | |

(52) U.S. Cl.
CPC ... *C02F 1/70* (2013.01); *C02F 1/76* (2013.01); *C02F 2101/101* (2013.01); *C02F 2209/005* (2013.01); *C02F 2209/02* (2013.01); *C02F 2209/03* (2013.01); *C02F 2209/04* (2013.01); *C02F 2209/05* (2013.01); *C02F 2209/06* (2013.01); *C02F 2209/08* (2013.01); *C02F 2303/02* (2013.01)
USPC ...... 422/5; 422/120; 422/123; 95/8; 210/749; 210/757; 210/758

(58) Field of Classification Search
CPC ..................................... C02F 1/70; C02F 1/72
USPC .............. 422/5, 120, 123; 210/749, 757, 758; 95/8
See application file for complete search history.

(56) References Cited

U.S. PATENT DOCUMENTS

| | | | |
|---|---|---|---|
| 191,476 | A | 5/1877 | Seligman |
| 221,232 | A | 11/1879 | Hirsh |
| 653,741 | A | 7/1900 | Jewell |
| 1,543,939 | A | 6/1925 | Maclachlan |
| 1,701,825 | A | 2/1929 | Seil |
| 1,991,242 | A | 2/1935 | Cole et al. |
| 1,997,252 | A | 4/1935 | Fischer |
| 2,171,203 | A | 8/1939 | Urbain et al. |
| 2,310,655 | A | 2/1943 | Schneider |
| 2,673,143 | A | 3/1954 | Du Fresne et al. |
| 2,852,584 | A | 9/1958 | Komline |
| 3,080,253 | A | 3/1963 | Dietz et al. |
| 3,219,576 | A | 11/1965 | Makabe |
| 3,236,726 | A | 2/1966 | Ross |
| 3,259,571 | A | 7/1966 | Marshall et al. |
| 3,300,404 | A | 1/1967 | Howe et al. |
| 3,377,271 | A | 4/1968 | Cann |
| 3,401,113 | A | 9/1968 | Pruessner et al. |
| 3,502,566 | A | 3/1970 | Raymond et al. |
| 3,522,173 | A | 7/1970 | Lindman et al. |
| 3,607,736 | A | 9/1971 | Miyaji |
| 3,639,263 | A | 2/1972 | Troscinski et al. |
| 3,697,322 | A | 10/1972 | Lee et al. |
| 3,705,098 | A | 12/1972 | Shepherd et al. |
| 3,862,851 | A | 1/1975 | Speirs et al. |
| 3,867,284 | A | 2/1975 | Kappe et al. |
| 3,915,853 | A | 10/1975 | Luck |
| 3,930,998 | A | 1/1976 | Knopp et al. |
| 3,948,774 | A | 4/1976 | Lindman |
| 3,953,335 | A | 4/1976 | Jackson |
| 3,957,674 | A | 5/1976 | Sano et al. |
| 3,959,127 | A | 5/1976 | Bartha et al. |
| 3,959,130 | A | 5/1976 | Kloster et al. |
| 3,966,450 | A | 6/1976 | O'Neill et al. |
| 3,974,783 | A | 8/1976 | Flynn |
| 4,007,262 | A | 2/1977 | Bowers |
| 4,049,545 | A | 9/1977 | Horvath |
| 4,093,544 | A | 6/1978 | Ross |

(Continued)

FOREIGN PATENT DOCUMENTS

| | | | |
|---|---|---|---|
| CA | 2169319 | A1 | 8/1996 |
| CA | 2225223 | A1 | 6/1999 |
| DE | 3414556 | A1 | 10/1985 |
| GB | 424919 | A | 3/1935 |
| GB | 2123516 | A | 2/1984 |
| JP | 57187099 | A | 11/1982 |
| JP | 10328676 | A | 12/1998 |
| JP | 11156374 | A | 6/1999 |

OTHER PUBLICATIONS

Poduska, R.A., et al., "Successful storage lagoon odor control", Journal Water Pollution Control Federation, 53 (3):299,310; Mar. 1981.
Pomeroy et al., "Feasibility Study on In-Sewer Treatment Methods," U.S. Environmental Protection Agency, PB 271 445, Aug. 1977, 106 pages.
Pomeroy et al., "Process Design Manual for Sulfide Control in Sanitary Sewerage Systems," U.S. Environmental Protection Agency, Oct. 1974, 136 pages.

(Continued)

*Primary Examiner* — Regina M Yoo

(57) ABSTRACT

An odor control composition may be dosed to a wastewater treatment system to control hydrogen sulfide levels. The composition may include a sulfide-reducing agent and an oxidizer. Synergy between the compounds of the odor control composition may facilitate efficient reduction of hydrogen sulfide levels. The sulfide-reducing agent and the oxidizer may be present in a single odor control composition or may be dosed to the system separately.

11 Claims, 2 Drawing Sheets

(56) References Cited

U.S. PATENT DOCUMENTS

| | | |
|---|---|---|
| 4,098,690 A | 7/1978 | Semmens |
| 4,108,771 A | 8/1978 | Weiss |
| 4,108,777 A | 8/1978 | Kurita et al. |
| 4,110,117 A | 8/1978 | McLeod |
| 4,115,258 A | 9/1978 | Smith et al. |
| 4,118,319 A | 10/1978 | Miyanohara et al. |
| 4,123,355 A | 10/1978 | Frosch et al. |
| 4,125,466 A | 11/1978 | Miyanohara et al. |
| 4,148,726 A | 4/1979 | Smith |
| 4,153,547 A | 5/1979 | McLean |
| 4,169,906 A | 10/1979 | Hallstrom et al. |
| 4,224,154 A | 9/1980 | Steininger |
| 4,229,300 A | 10/1980 | Benes et al. |
| 4,297,216 A | 10/1981 | Ishida et al. |
| 4,304,673 A | 12/1981 | Reynolds et al. |
| 4,340,489 A | 7/1982 | Adams et al. |
| 4,446,031 A | 5/1984 | List |
| 4,456,635 A | 6/1984 | Albanese et al. |
| 4,461,708 A | 7/1984 | Hakulinen et al. |
| 4,501,668 A | 2/1985 | Merk et al. |
| 4,505,819 A | 3/1985 | Barnes et al. |
| 4,537,686 A | 8/1985 | Borbely et al. |
| 4,566,469 A | 1/1986 | Semp et al. |
| 4,574,076 A | 3/1986 | Castrantas |
| 4,612,124 A | 9/1986 | Escrig |
| 4,615,873 A | 10/1986 | Devuyst et al. |
| 4,615,918 A | 10/1986 | Reichert et al. |
| 4,622,149 A | 11/1986 | Devuyst et al. |
| 4,668,541 A | 5/1987 | Fagerlund |
| 4,670,315 A | 6/1987 | Hillemeier et al. |
| 4,675,114 A | 6/1987 | Zagyvai et al. |
| 4,680,127 A | 7/1987 | Edmondson |
| 4,681,687 A | 7/1987 | Mouche et al. |
| 4,710,248 A | 12/1987 | Yates et al. |
| 4,710,404 A | 12/1987 | Reichert et al. |
| 4,725,405 A | 2/1988 | Cassin et al. |
| 4,760,027 A | 7/1988 | Sublette |
| 4,781,842 A | 11/1988 | Nicholson |
| 4,786,525 A | 11/1988 | Kayser et al. |
| 4,802,996 A | 2/1989 | Mouche' et al. |
| 4,818,404 A | 4/1989 | McDowell |
| 4,849,128 A | 7/1989 | Timmons et al. |
| 4,911,843 A | 3/1990 | Hunniford et al. |
| 4,913,826 A | 4/1990 | Mannig et al. |
| 4,966,714 A | 10/1990 | Hirosawa et al. |
| 4,967,559 A | 11/1990 | Johnston |
| 5,008,020 A | 4/1991 | Surash et al. |
| 5,045,213 A | 9/1991 | Bowers |
| 5,076,928 A | 12/1991 | Ballnus |
| 5,076,937 A | 12/1991 | Montgomery |
| 5,088,020 A | 2/1992 | Nishida et al. |
| 5,114,587 A | 5/1992 | Hagerstedt |
| 5,141,647 A | 8/1992 | Bhadra |
| 5,180,429 A | 1/1993 | Khasanov |
| 5,200,092 A | 4/1993 | Richards et al. |
| 5,211,852 A | 5/1993 | Van de Walle et al. |
| 5,223,031 A | 6/1993 | Sugi et al. |
| 5,228,995 A | 7/1993 | Stover |
| 5,242,708 A | 9/1993 | Fekete et al. |
| 5,246,641 A | 9/1993 | Perkins et al. |
| 5,298,174 A | 3/1994 | Momont et al. |
| 5,336,431 A | 8/1994 | Richards et al. |
| 5,340,469 A | 8/1994 | Montgomery |
| 5,350,516 A | 9/1994 | Bhadra |
| 5,350,522 A | 9/1994 | Fyson |
| 5,352,444 A | 10/1994 | Cox et al. |
| 5,385,842 A | 1/1995 | Weimer et al. |
| 5,422,015 A | 6/1995 | Angell et al. |
| 5,480,550 A | 1/1996 | Sublette |
| 5,482,630 A | 1/1996 | Lee et al. |
| 5,500,368 A | 3/1996 | Tatnall |
| 5,514,357 A | 5/1996 | Richmond et al. |
| 5,525,155 A | 6/1996 | Allen |
| 5,603,832 A | 2/1997 | Hoyvik et al. |
| 5,616,283 A | 4/1997 | Huege et al. |
| 5,620,744 A | 4/1997 | Huege et al. |
| 5,683,748 A | 11/1997 | Gunderson |
| 5,705,072 A | 1/1998 | Haase |
| 5,718,944 A | 2/1998 | Miller |
| 5,807,587 A | 9/1998 | Cox et al. |
| 5,833,864 A | 11/1998 | Miller et al. |
| 5,834,075 A | 11/1998 | Miller |
| 5,905,037 A | 5/1999 | Cooney, Jr. et al. |
| 5,948,269 A | 9/1999 | Stone |
| 5,951,946 A | 9/1999 | Eaton et al. |
| 5,958,334 A | 9/1999 | Haddon |
| 5,984,993 A | 11/1999 | Mainz et al. |
| RE36,651 E | 4/2000 | Hunniford et al. |
| 6,045,695 A | 4/2000 | Janssen et al. |
| 6,056,997 A | 5/2000 | Miller |
| 6,059,973 A | 5/2000 | Hudson et al. |
| 6,069,973 A | 5/2000 | Lin et al. |
| 6,136,193 A | 10/2000 | Haase |
| 6,146,522 A | 11/2000 | Fernholz et al. |
| 6,221,652 B1 | 4/2001 | Janssen et al. |
| RE37,181 E | 5/2001 | Hunniford et al. |
| 6,235,196 B1 | 5/2001 | Zhou et al. |
| 6,309,597 B1 | 10/2001 | Ballinger, Jr. et al. |
| 6,409,926 B1 | 6/2002 | Martin |
| 6,410,305 B1 | 6/2002 | Miller et al. |
| 6,419,817 B1 | 7/2002 | Martin |
| 6,576,144 B1 | 6/2003 | Vineyard |
| 6,620,315 B2 | 9/2003 | Martin |
| 6,623,647 B2 | 9/2003 | Martin |
| 6,652,758 B2 | 11/2003 | Krulik |
| 6,660,163 B2 | 12/2003 | Miklos |
| 6,666,975 B1 | 12/2003 | Chen et al. |
| 6,716,359 B1 | 4/2004 | Dennis, II |
| 6,773,604 B2 | 8/2004 | Walton et al. |
| 6,893,862 B1 | 5/2005 | Horn et al. |
| 7,087,172 B2 | 8/2006 | Hunniford et al. |
| 7,138,049 B2 | 11/2006 | Hunniford et al. |
| 7,160,712 B2 | 1/2007 | Christiansen |
| 7,186,341 B2 | 3/2007 | Hunniford et al. |
| 7,285,217 B2 | 10/2007 | Simpson et al. |
| 7,326,340 B2 | 2/2008 | Harshman et al. |
| 7,390,399 B2 | 6/2008 | Dennis, II et al. |
| 7,553,420 B2 | 6/2009 | Simpson et al. |
| 7,799,215 B2 | 9/2010 | Matheis et al. |
| 7,799,224 B2 | 9/2010 | Matheis et al. |
| 7,972,532 B2 | 7/2011 | Simpson et al. |
| 2002/0102229 A1 | 8/2002 | Wegner |
| 2002/0182710 A1 | 12/2002 | Horn et al. |
| 2004/0136770 A1 | 7/2004 | Muhr-Sweeney |
| 2004/0173525 A1* | 9/2004 | Hunniford et al. ............ 210/610 |
| 2004/0226891 A1 | 11/2004 | Dentel |
| 2005/0077251 A1 | 4/2005 | Rieth et al. |
| 2005/0142096 A1 | 6/2005 | Wegner |
| 2005/0224409 A1* | 10/2005 | Harshman et al. ............ 210/610 |
| 2005/0242010 A1* | 11/2005 | Hunniford et al. ........... 210/96.1 |
| 2006/0006121 A1 | 1/2006 | Simpson et al. |
| 2006/0014798 A1 | 1/2006 | Turchetta et al. |
| 2006/0131245 A1 | 6/2006 | Dennis et al. |
| 2007/0196319 A1 | 8/2007 | Alfrey et al. |
| 2009/0188859 A1 | 7/2009 | Matheis et al. |
| 2009/0250389 A1 | 10/2009 | Simpson et al. |
| 2010/0012558 A1 | 1/2010 | Matheis et al. |

OTHER PUBLICATIONS

Pomeroy et al., "Sulfide Occurrence and Control in Sewage Collection Systems," Grant No. 11010 ENX, U.S Environmental Protection Agency, Washington, D.C., 173 pages.

Pomeroy, "Calcareous Pipe for Sewers," Journal Water Pollution Control Federation, vol. 41, No. 8, Aug. 1969, p. 1491.

Pomeroy, "Controlling Sewage Plant Odors," Consulting Engineer, Feb. 1963, pp. 101-104.

Pomeroy, "Generation and Control of Sulfide in Filled Pipes," Sewage and Industrial Wastes, vol. 31, No. 9, 1959, p. 1082.

Pomeroy, "Progress Report on Sulfide Control Research," Sewage Works Journal, vol. 18, No. 4, Jul. 1946, p. 597.

(56) References Cited

OTHER PUBLICATIONS

Prakasam, T.B.S., et al., "Microbial Dentrification of a Wastewater Containing high Concentrations of Oxidized Nitrogen", Proceedings of the 31st Industrial Wste Conference, May 4-6, 1976, Purdue University.
Press Release, "ACM Products to Save Los Angeles Millions of Dollars in Sewer Pipe Replacement Costs," Aug. 2001, 1 page.
Price, E.C., et al., "Sewage Treatment Plants Combat Odor Pollution Problems", Water and Sew. Works, 125, 10, 64 (1978).
Product Report/Surfactants for household detergents—petrochemial raw materials and uses, pp. 40-41, C&EN, Jan. 24, 1994.
Reid, et al., "Sewer Odor Studies," Sewage and Industrial Wastes, vol. 28, No. 8, Aug. 1956, pp. 991-997.
Renholds, "In Situ Treatment of Contaminated Sediments," Dec. 1998, U.S. Environmental Protection Agency Office of Solid Waste and Emergency Response, Technology Innovation Office, Washington, D.C.
Rodriguez-Gomez, et al., "Inhibition of Sulfide Generation in a Reclaimed Wastewater Pipe by Nitrate Dosage and Dentrification Kinetics," Water Environment Research, vol. 77, No. 2, pp. 193-198 (Mar./Apr. 2005).
Ryan, W.A., "Experiene with Sodium Nitrate Treatment of Cannery Wastes," Sew. Works Joru., 17, 1227 (1945).
Sanborn, N.H., "Nitrate Treatment of Cannery Waste," The Fruit Products Journal and American Vinegar Industry (1941).
Santry, "Odor Control," Journal Water Pollution Control Federation, Mar. 1966, pp. 460-462.
Santry, Jr., "Hydrogen Sulfide in Sewers," Journal WCP, vol. 35, No. 12, Dec. 1963, pp. 1580-1586.
Sewage Works Journal, published by California Sewage Works Association, Jul. 1946, vol. XVIII, No. 1, pp. 34-45.
Sewer Corrosion Control and Rehabilitation, County Sanitation Districts of Los Angeles County, 5 pages, (undated).
Simpson, The Reduction of the Chlorite Ion, Fourth International Symposium on Chlorine Dioxide, Feb. 15 & 16, 2001, Caesars' Palace, Las Vegas, Nevada., pp. 1-10.
Stahl, J., "Notice Inviting Bids for Liquid Magnesium Hydroxide," to the Purchasing Agent of County Sanitation District No. 2 of Los Angeles County, State of California, Aug. 2002, 6 pages.
Sydney et al., "Control concrete sewer corrosion via the crown spray process," Water Environment Research, vol. 68, No. 3, May/Jun. 1996, pp. 338-342.
Tarquin, A. et al., Reduction of Chlorite Concentrations in Potable Water and Ferrous Chloride, Disinfection Practice, Water/Engineering & Management, Feb. 1995, pp. 35-37.
Thistlethwayte, "The Control of Sulphides in Sewerage Systems," Chapter 13—Corrective Measures for Existing Systems, pp. 153-164, (1972).
USFilter Corporation, Strantrol MG/L 5 Controller, Data Sheet, 2004.
USFilter Wallace & Tiernan Worldwide Multi Function Analysers Depolox 4, Technical Information, 1999.
Vulcan Chemicals Technical & Environmental Services, Technical Data Sheet, "Hydrogen Sulfide Control in Wastewater Collection Systems," TD5 642-420, I page, Aug. 1995.
Willenbring et al., "Calcium Nitrate" (incomplete title), Oct. 1988 or earlier.
Meyer et al., "Integrated Odor Control using Nitrate Enhanced by Alkaline Material and Anthraquinone," 83rd Annual Water Environment Federation Technical Exhibition and Conference, Oct. 2-8, 2010, pp. 4542-4561.
Microbial Energy Generation/Oxidation of Inorganic Substrates, pp. 158-159.
OxyChem Technical Data Sheet, "Hydrogen Sulfide Control in Wastewater Collection Systems," TDS 642-02, 2 pages, Jan. 2009.
"Biochemical Oxidation of Polluted Lake Sediment with Nitrate-A new Lake Restoration Method", 1976.

"Detection, Control, and Correction of Hydrogen Sulfide Corrosion in Existing Wastewater Systems," United States Environmental Protection Agency, Office of Water (WH-547) EPA 8320R-92-001 Sep. 1992.
"Methods for Chemical Analysis of Water and Wastes", U.S. Environmental Protection Agency, (1974) pp. 1-150.
"Methods for Chemical Analysis of Water and Wastes", U.S. Environmental Protection Agency, (1974), pp. 151-315.
"Odor & Corrosion Control Microbiology—Metabolic Pathways of Odor & Corrosion Potential", In-Pipe Technology, publication date unknown (6 pages).
"Standard Methods for the Examination of Water and Wastewater", 14th Ed., Amer. Pub. Health Assn., Wash. D.C., 499-509 (1976).
"Water Supply and Sewerage", Ernest W. Steel, Chapter 27, pp. 600-601 (4th Ed. 1960).
'Mother Knows Best! The fascinating healing benefits of DHEA the body's "mother hormone!"' Bio/Tech News, 1995, pp. 1-8.
Altivia Corporation, Letter dated Mar. 4, 2005 from Altivia Corporation to Yogesh Mehta, City of Houston, Public Works and Engineering.
Badia et al., Caustic Spray for Sewer Crown Corrosion Control, 11 pages.
Barber et al., "Chemical Control of Hydrogen Sulfide From Anaerobic Swine Manure," Canadian Agricultural Engineering, pp. 90-96, vol. 17, No. 2, Dec. 1975.
Basic Research on Sulfide Occurrence and Control in Sewage Collection Systems, Los Angeles County Sanitation District, NTIS, U.S. Dept. of Commerce, Feb. 28, 1969.
Beardsley et al., "Removal of Sewer Odors by Scrubbing with Alkaline Solutions," Sewage and Industrial Wastes, vol. 30, Jan.-Dec. 1958, pp. 220-225.
Bowker et al., "Odor and Corrosion Control in Sanitary Sewerage Systems and Treatment Plants," Copyright 1989, ISBN 0-8155-1192-2, pp. 59 and 60.
Bowker et al., "Odor and Corrosion Control in Sanitary Sewerage Systems and Treatment Plants," EPA Design Manual, United States Environmental Protection Agency, EPA/625/1-85/018, Oct. 1985 pp. 1-132.
Bryan, "Experiences with Odor Control at Houston, Texas," Sewage and Industrial Wastes, vol. 28, No. 12, Dec. 1956, pp. 1512-1514.
Caffey et al., "Magnesium Hydroxide Feed Reduces Odor and Provides pH Stabilization at a North Texas Municipal Wastewater Plant," Texas Water 2007 Conference Proceedings, Wastewater Odor Control, pp. 1-12.
Carpenter, W.T. "Sodium Nitrate Used to Control Nuisance", Water Works and Sew., 79, 175 (1932).
Cox et al.,"Odor Control and Olfaction," Pollution Sciences Publishing Company, pp. 85, 454, 457, undated.
Dague, R.R, "Fundamentals of Odor Control", Journal Water Pollution Control Federation, 44(4): 583-594; Apr. 1972.
Davis Process Division of Davis Water & Waste Industries, Inc.; Process Division Technical Bulletin No. B-401, Bioxide . . . The natural solution, A Proprietary Product, Designed to Promote Naturally Occurring Process Within Wastewater Collection and Treatment Systems Which Eliminate Order Producing Compounds.
Directo et al., "Pilot plant study of physical-chemical treatment", Journal Water Pollution Control Federation, 649 (1)):2,081-2,098; Oct. 1977.
Dixon, K. L. et al., The Effect of Sulfur-Based Reducing Agents and GAC Filtration on Chlorine Dioxide By-products, Research and Technology, Journal AWWA, May 1991, pp. 48-55.
Eliassen, R., et al., "The Effect of Chlorinated Hydrocarbons on Hydrogen Sulfide Production", Sew. Works Jour., 21, 457 (1949).
Excerpts from ASCE Manuals and Reports on Engineering Practice—No. 69 titled "Sulfide in Wastewater Collection and Treatment Systems" (undated).
Fales, A.L., "Treatment of Industrial Wastes from Paper Mills and Tannery on Neponset River", Jour. Ind. Eng. Chem., 21, 216 (1929).
Geraghty & Miller, Inc., "Five Year Review of Remedial Actions at the Van Waters & Rogers Inc., Project No. AZ0474.011," Prepared for Univar Corporation by Geraghty & Miller, Inc., Nov. 8, 1995.

(56) References Cited

OTHER PUBLICATIONS

Gordon, Gilbert et al., Minimizing Chlorite Ion and Chlorate Ion I Water Treated with Chlorine Dioxide, Research and Technology, Journal AWWA, Apr. 1990, pp. 160-165.

Griese, Mark H. et al., Using Reducing Agents to Eliminate Chlorine Dioxide and Chlorite Ion Residuals in Drinking Water, Research and Technology, Journal AWWA, May 1991, pp. 56-61.

Hale, Bert et al., Use of Vitamin C and Sodium Erythorbate for Chlorite Reduction—Field Trial Results, AWA A1-MS Section Annual Conference, Beau Rivage Resort and Casino, Biloxi, MS, Oct. 5-7, 2003, pp. 1-10.

Helmer, R. et al., editors, "Water Pollution Control—A Guide to the Use of Water Quality Management Principles," E & FN Spon. (1997).

Heukelekian, H., "Effect of the Addition of Sodium Nitride to Sewage on Hydrogen Sulfide Production and B.O.D. Reduction", Sewage Works Journal 15(2)255-261 (1943).

Heukelekian, H., "Some Bacteriological Aspects of Hydrogen Sulfide Production from Sewage", Sew. Works Jour. 20, 490 (1948).

Higgins, M.J. et al., "Controlling Hydrogen Sulfide in Wastewater Using Base Addition," Proceedings of WEFTEC® '97, Water Environment Federation, 70th Annual Conference & Exposition, Chicago, IL, vol. 2, Part 1, "Residuals and Biosolids Management"—Part II—Collection Systems, (1997) pp. 587-594.

James, "Control Sewer Crown Corrosion Using the Crown Spray Process," U-Tech Underground Technology, Underground Construction, Sep. 2004, pp. 60-65, www.undergroundconstructiononline.com.

Jenneman et al., "Effect of Nitrate on Biogenic Sulfide Production,"Applied and Environmental Microbiology, Jun. 1986, vol. 51, No. 6, pp. 1205-1211 (7 pages).

Lang, M., "Chemical Control of Water Quality in a Tidal Basin", Journal WPCF, 1414-1416 (1966).

Lawrance, W.A., "The Addition of Sodium Nitrate to the Androscoggin River", Sew. and Ind. Wastes, 22, 820 (1950).

Lee et al., "Metals Meet Their Match," Water Environment & Technology, Sep. 1993, pp. 69-73.

Lorgan, G.P., et al., "Nitrate Addition for the Control of Odor Emissions from Organically Overloaded, Super Rate Trickling Filters", 33rd Ann. Purdue Ind. Waste Conf., West Lafayette, Ind., (1978).

Marshall et al., "Preparing Collection Systems for Water Conservation," Water Environment & Technology, Aug. 1993, pp. 52-57.

McKinney, R.E., "The Role of Chemically Combined Oxygen in Biological Systems", Jour. San. Eng. Div., proc. Amer. Soc. Civil Engr., 82 SA4, 1053 (1956).

Metcalfe and Eddy, Wastewater Engineering, Treatment, Disposal, and Reuse, 3rd edition, 1991, pp. 108-110; 769-770.

Microbial Energy Generation/Oxidation of Inorganic Substrates, pp. 158-159. (undated).

Moss et al., "Full-scale use of physical/chemical treatment of domestic wastewater at Rocky River, Ohio", Journal Water Pollution Control Federation, 49(11): 2,249-2,254; Nov. 1977.

Newell, C. J., "Modeling Intrinsic Remediation With Multiple Electron Acceptors: Results From Seven Sites", Petroleum Hydrocarbons and Organic Chemicals in Ground Water Conference, Houston Texas, Nov. 29, 1995.

Olenik, "Domestic Sewage and Refuse Odor Control,"Industrial Odor Technology Assessment, 1956, Ann Arbor Science Publishers Inc., pp. 117-146.

Ondrus, Martin G. et al., The Oxidation of Hexaaquoiron (II) by Chlorine (III) in Aqueous Solution, Inorganic Chemistry, vol. 11, No. 5, 1972, pp. 985-989.

Painter, H.A., "A Review of Literature on Inorganic Nitrogen Metabolism in Microorganisms", Water Research, The Journal of the International Assocation on Water Pollution Research, vol. 4, No. 6, (1970).

Poduska, R.A., "Operation, control, and Dynamic Modeling of the Tennessee Eastman Company Industrial Wastewater Treatment System", 34th Ann. Purdue Indust. Waste Conf., Lafayette, Md. (1979).

* cited by examiner

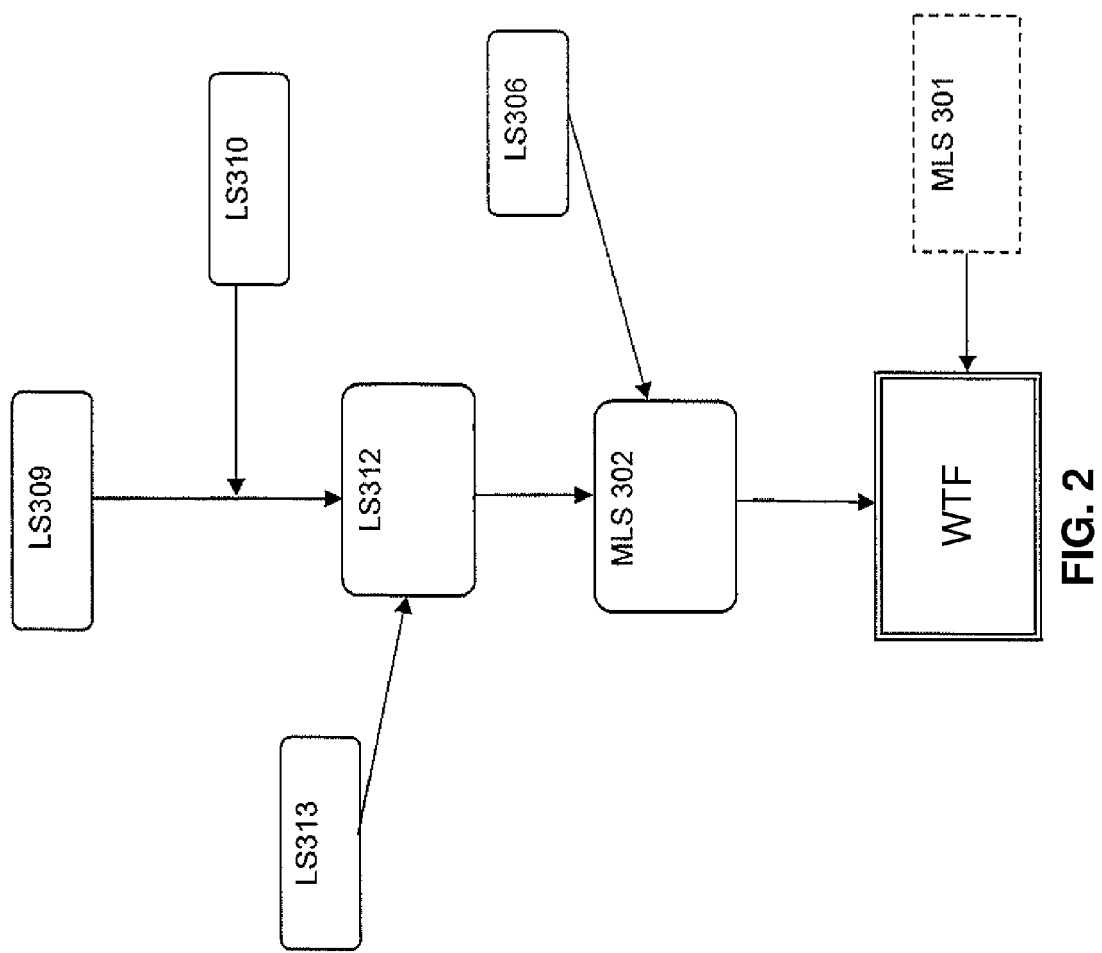

SYNERGISTIC METHODS FOR ODOR CONTROL

CROSS-REFERENCE TO RELATED APPLICATION

This application claims the benefit under 35 U.S.C. §119(e) to U.S. Provisional Patent Application Ser. No. 61/444,190, titled SYNERGISM OF NITRATE SALTS AND CHLORITE FOR REMOVAL AND/OR PREVENTION OF HYDROGEN SULFIDE IN SEWERS and filed on Feb. 18, 2011, the entire disclosure of which is hereby incorporated herein by reference in its entirety for all purposes.

FIELD OF THE TECHNOLOGY

Aspects relate generally to wastewater treatment and, more particularly, to methods for controlling hydrogen sulfide levels in wastewater treatment operations.

BACKGROUND

Odor control in wastewater treatment processes is typically focused on the prevention and elimination of hydrogen sulfide. Hydrogen sulfide is a colorless and odorous gas created in wastewater collection systems by the biochemical reduction of sulfate. Sulfate is a naturally occurring substance present in most well water supplies, dissolved naturally therein through geologic contact. Sulfate reducing bacteria are commonly present in wastewater collection and treatment systems. They convert sulfate to sulfide ions in wastewater systems deficient of dissolved oxygen, a condition typically occurring when wastewater is pumped long distances. Sulfide ions in turn react with excess hydrogen ions to form hydrogen sulfide gas which has an offensive odor. Humans can sense hydrogen sulfide at very low levels in air. Hydrogen sulfide is particularly offensive in concentrations near about 10 ppm and can cause respiratory paralysis if in excess of about 1000 ppm.

Nitrate salts, such as those of sodium and calcium, are commonly used for odor control in wastewater collection and treatment systems. Nitrate salts may generally offer an alternative source of oxygen to bacteria for biochemical metabolism, such that sulfates will not be reduced, and may also be effective in removing hydrogen sulfide. Liquid solutions of calcium nitrate and/or sodium nitrate may be injected into a wastewater collection system to remove and control hydrogen sulfide downstream. Nitrate salts can also be used to remove existing sulfide present at the point of addition of nitrate material. The nitrate is generally reduced by a denitrification process to odorless nitrogen gas, which may be safely emitted from the wastewater treatment system.

SUMMARY

One or more aspects relate generally to methods for wastewater treatment.

In accordance with one or more aspects, a method of controlling odor in a water treatment system may comprise introducing a process stream at an inlet of the water treatment system, measuring a sulfide level at an outlet of the water treatment system, selecting an odor control composition comprising a sulfide-reducing agent and an oxidizer, and reducing the sulfide level measured at the outlet to below a threshold value by adding the selected odor control composition to the process stream at a dosage less than that which would be required if the sulfide-reducing agent and the oxidizer were acting alone.

In accordance with one or more aspects, a method of facilitating odor control in a water treatment system may comprise providing an odor control composition comprising a sulfide-reducing agent and an oxidizer to be dosed to a process stream of the water treatment system, and providing instructions to add the odor control composition to the process stream at a dosage that is sufficient to reduce a sulfide level measured at an outlet of the system to below a threshold value and that is less than an amount of the composition that would be required if the sulfide-reducing agent and the oxidizer were acting alone. The method may further comprise monitoring the sulfide level at the outlet of the water treatment system. The method may further comprise adjusting the dosage of the odor control composition based on the monitored sulfide level at the outlet of the water treatment system.

In some aspects, the sulfide-reducing agent comprises a nitrate compound. The sulfide-reducing agent may comprise calcium nitrate. In some aspects, the oxidizer comprises a chlorite compound. The oxidizer may comprise sodium chlorite. The oxidizer may comprise about 0.1 to about 10 wt. % of the odor control composition. In some specific aspects, the oxidizer may comprise about 1 to about 2.5 wt. % of the odor control composition. The odor control composition may further comprise a pH elevating compound. Methods may further comprise adjusting the amount of the odor control composition added to the process stream. Components of the odor control composition may be added as a blend or separately at one or more dosage points.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 2 presents a schematic representation of a wastewater treatment system referenced in an accompanying Example in accordance with one or more embodiments.

DETAILED DESCRIPTION

Figure 1:
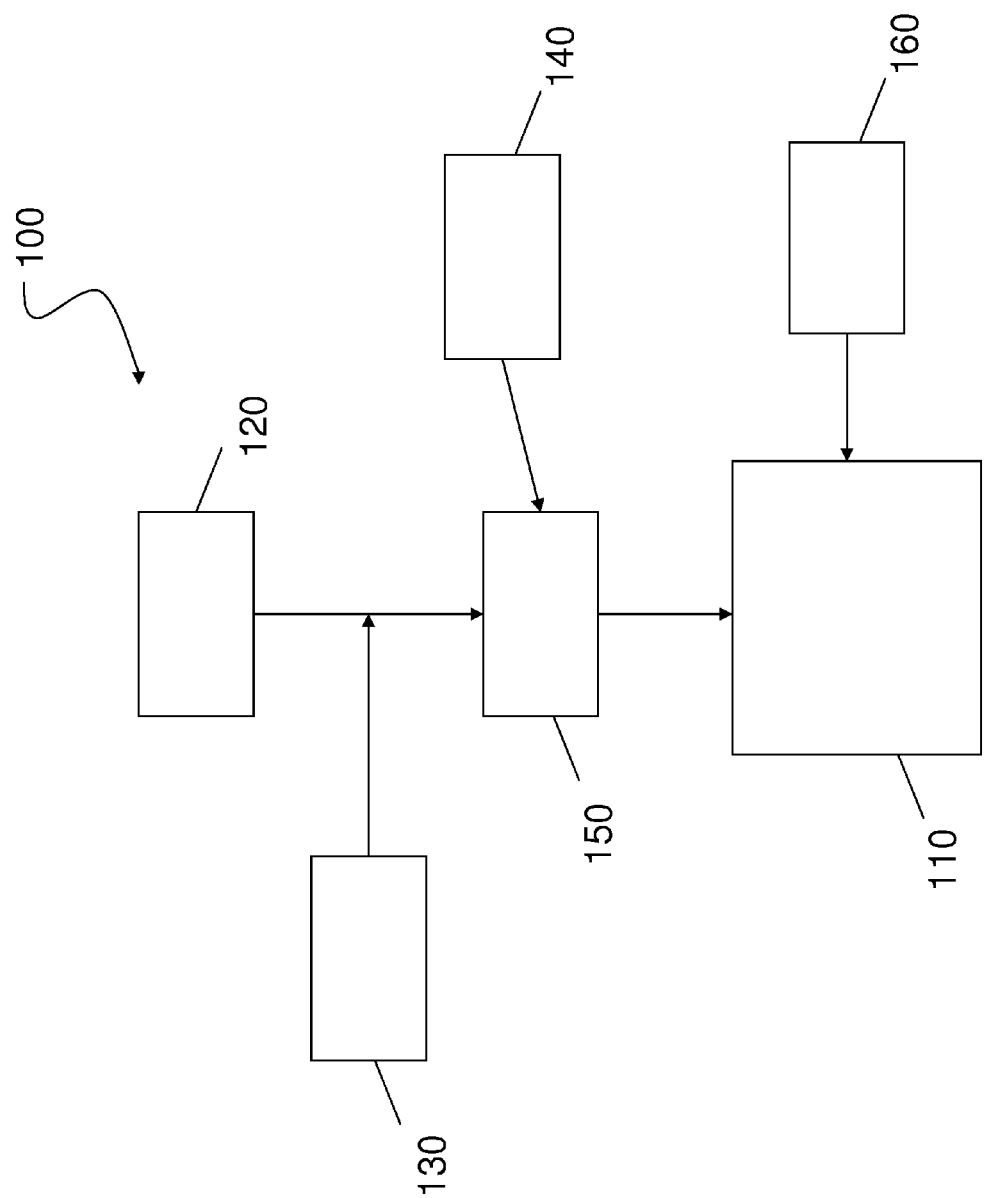
FIG. 1 presents a schematic representation of a wastewater treatment system in accordance with one or more embodiments.

One or more embodiments relate generally to wastewater treatment. The disclosed methods may provide a substantial advantage by controlling hydrogen sulfide levels in wastewater treatment operations. Embodiments may be particularly efficient in comparison to conventional odor control techniques. Some embodiments may involve use of an odor control composition in a lesser quantity than an alternative odor control composition while providing a substantially equivalent level of treatment. Other embodiments may use a substantially equivalent amount of an odor control composition compared to an alternative odor control composition while providing a superior level of treatment. Thus, the methods disclosed herein may diminish the quantity of an odor control composition needed and/or may augment the effectiveness of an odor control treatment process. This facilitation of odor control processes may lead to substantial cost savings and greater efficiency to the benefit of end users.

One or more embodiments relate generally to wastewater treatment methods. A wastewater treatment system may receive wastewater from a community, industrial, or residential source during typical operation. For example, the wastewater may be delivered from a municipal or other large-scale sewage system. Alternatively, the wastewater may be generated, for example, by food processing or pulp and paper plants.

Wastewater may generally be any stream of waste, bearing at least one undesirable constituent, deliverable to the wastewater treatment system for treatment and/or removal. In some embodiments, the undesirable constituents may include organic waste produced by metabolic processes, including human and animal waste. Other undesirable constituents treatable in accordance with one or more embodiments include, but are note limited to industrial wastes, effluents and sewage. The type and concentration of undesirable constituents present in the wastewater may be site-specific. Communities may establish regulations regarding these undesirable constituents and what may be released from the treatment system. For the purposes of the present description, wastewater may refer to what is fed to the system for treatment and what is treated throughout. A process stream generally associated with the treatment system may include wastewater delivered to the system or in the process of being treated by the system.

In accordance with one or more embodiments, wastewater may enter a wastewater treatment system from a source at any flow rate. The system may generally be sized to accommodate any flow rate. Without being limited, it is believed that the flow rate may be as high as 3 million gallons per day in some embodiments. It is also recognized that lower and higher flow rates can be accommodated by various embodiments. The wastewater may generally enter the system at one or more inlets.

In accordance with one or more embodiments, a wastewater treatment system may generally include one or more wastewater storage tanks, basins or vessels. The storage tank may generally be constructed and arranged to facilitate collection of wastewater for treatment by the system. In some embodiments, a storage tank may hold a desired volume of wastewater to feed one or more downstream treatment operations. For example, a storage tank may be capable of accommodating any fluctuation in flow rate to normalize flow through system. In other embodiments, storage tank may participate in moving wastewater over a distance for treatment. For example, a storage tank may be used to transport wastewater from a source to an end or intermediate location by collecting it for subsequent pumping or other distribution. A storage tank may also generally provide a residence time, such as may allow for activation of one or more dosed treatment agents. The size and shape of the storage tank may be site-specific and may vary based on requirements of an intended application. Likewise, residence time of wastewater within the storage tank may also vary based on established design parameters. In at least one embodiment, a storage tank may be a wet well or like structure. Equipment such as pumps, hoses, level sensors and cleaning devices may be associated with a wet well as commonly known in the art. Various biological environments may exist within the system. In some embodiments, for example, a wet well may be generally characterized by substantially anoxic conditions, or otherwise as containing low or substantially no dissolved oxygen.

In accordance with one or more embodiments, a wastewater treatment system may include a source of one or more compounds or agents generally capable of controlling hydrogen sulfide levels in the wastewater. In some embodiments, the compound(s) may be capable of removing at least a portion of one or more undesirable constituents present in the wastewater, such as hydrogen sulfide. In at least one embodiment, the compound(s) may be capable of inhibiting the reduction of sulfates by sulfate reducing bacteria in the wastewater to prevent formation of hydrogen sulfide. Without wishing to be bound by any particular theory, a compound supplied to the system may provide an alternative source of oxygen or alternative metabolic pathway such that upon depletion of dissolved oxygen levels within the wastewater, bacteria will reduce that compound rather than sulfate. In this way, hydrogen sulfide levels may be controlled.

One or more odor control compounds or agents may be added at any point within the treatment system. In some embodiments, the compound(s) may be dosed to a wastewater stream at any point downstream of its source. In at least one embodiment, the compound(s) may be dosed in a wet well. In other embodiments, the compound(s) may be dosed upstream or downstream of any wet well. In still other embodiments, the compound(s) may be dosed at more than one point in the system. In some embodiments, any amount of time required for activation of a compound supplied may influence strategic dosing of that compound, such as may relate to dosage quantity and/or positioning. For example, the compound may be dosed at one position for treatment of a downstream issue. An amount and/or frequency of dosing of one or more compounds may be site-specific and depend on various system parameters as well as characteristics of a wastewater stream to be treated.

In accordance with one or more embodiments, a first odor control compound may be dosed. In some embodiments, the first compound may be a nitrate-based compound. In some embodiments, a compound may be a source of at least one nitrate salt. For example, a source of calcium nitrate and/or sodium nitrate may be in fluid communication with one or more components of the system. Nitrate salts may be biochemically reduced to nitrogen gas through a process known as denitrification which is well documented in wastewater treatment processes. In at least one embodiment, a source of nitrate-based compound(s) such as nitrate salts may be added to a wet well, low point collection tank or other dosage point of a wastewater conveyance system for hydrogen sulfide control.

In typical operation, bacteria may reduce nitrate rather than sulfate in low dissolved oxygen environments. The nitrate may also be efficient in removing hydrogen sulfide present in a wastewater stream, for example, as disclosed in U.S. Pat. No. 4,911,843 to Hunniford et al. which is hereby incorporated herein by reference in its entirety for all purposes. The biochemical reaction reduces nitrate to nitrogen, and sulfide is oxidized primarily to sulfate. The compound should generally be supplied in an effective amount to remove hydrogen sulfide and/or to prevent its formation. No direct relationship between the amount of sulfide treated and the amount of nitrate applied for the sulfide prevention mechanism appears to be known. In some nonlimiting embodiments, an effective nitrate to sulfide mass ratio may be about ten-to-one but any other ratio may be implemented. Factors such as volume, wastewater flow rate, temperature and pH level of wastewater may impact dosage. Nitrogen gas is typically generated by denitrification and may be emitted, such as by vent structures commonly designed in wastewater collection piping systems.

In accordance with one or more embodiments, a second odor control compound may also be dosed. The second compound may, in some embodiments, be generally capable of interrupting a denitrification process. In some embodiments, a second compound may provide an alternative metabolic pathway which may be favored by bacteria even in the presence of the first compound. For example, the second compound may be more readily reduced by bacteria than the first compound in some embodiments. Thus, as long as sufficient quantity of the second compound is available, it will be more likely to be reduced than the first compound. Without wishing to be bound by any particular theory, the second compound may also be capable of removing one or more undesirable constituents, such as hydrogen sulfide, and/or may have an effect on a biomass present in the wastewater treatment system. For example, the second compound may have a harmful impact on a population of sulfate reducing bacteria which may, in turn, control levels of hydrogen sulfide formation.

The second compound, like the first compound, may be dosed at any point in the system. Dosage quantity, rate and/or position may be site-specific and may vary based on an intended application. In some embodiments, the second compound may be dosed proportionally to or otherwise based on an amount of the first compound, for example nitrate, dosed to the system. In other embodiments, the second compound may be dosed so as to provide an excess or residual of such compound in a desired location. In at least one embodiment, one or more odor control compounds may be dosed based on or in response to a detected oxidation reduction potential (ORP) level of a wastewater stream to be treated. Without wishing to be bound by any particular theory, a low ORP level may indicate a likelihood that denitrification will occur. One or more compounds may be dosed in response to such an indication to temporarily interrupt the denitrification process.

In accordance with one more embodiments, the second compound may comprise an oxidizer. In at least one embodiment, that compound may be a strong oxidizer relative to the first compound. In some nonlimiting embodiments, the second compound may be a chlorine-based oxidizer. For example, that compound may include one or more of chlorine dioxide, stabilized chlorine dioxide, chlorite, sodium chlorite, buffered sodium chlorite and sodium hypochlorite.

In accordance with one or more embodiments, a first compound may be referred to as a sulfide-reducing compound which may contribute to sulfide control via a biochemical mechanism. The second compound may be generally referred to as an oxidizer and may contribute to sulfide control via a predominantly chemical mechanism.

In accordance with one or more embodiments, one or more of the odor control compounds may be manually added to the water treatment system. In other embodiments, addition of one or more of compounds may be automatically administered. For example, a controller may be used to dose one or more compounds from sources to the system. This may be based on a predetermined time interval or in response to a signal received from one or more sensors associated with the system. Compounds may be stored in chemical storage tanks or drums. In at least one embodiment, one or more odor control compounds may be mixed to form an odor control mixture or composition to be dosed. Mixing may be conducted offsite or onsite. The compounds may be mixed in accordance with a predetermined ratio. Thus, a single odor control composition including, for example, the first and second compounds, may be dosed to the system. In other embodiments, the first and second compounds may be dosed separately. The compounds may then be dosed at the same dosage point or strategically dosed at different dosage points, such as to provide different residence times or order of addition.

In accordance with one or more embodiments, an odor control composition may further include other components such as, for example, a pH elevating compound or other pH adjuster, an alkalinity-enhancing compound, a sulfide-oxidating enzyme or a compound that is generally capable of adjusting the metabolic activity of at least a portion of microorganisms present in the wastewater.

In accordance with one or more embodiments, a wastewater treatment system may include one or more unit operations for treatment. Some treatment units may generally facilitate filtration and/or clarification of wastewater. A mechanical-based treatment unit may screen an influent wastewater stream to collect solids or other undesirable constituents, such as fats, oil and grease. In some embodiments, for example, the treatment unit may include a perforated plate continuous screen. Treatment units may also involve chemical treatment systems which, for example, precipitate, convert, or adjust a condition of a wastewater stream. Other treatment units may involve biological treatment of the wastewater stream to biologically convert one or more undesirable constituents to innocuous compounds. Some embodiments may include one or more polishing treatment units to further treat an effluent stream before it is released from the system. Wastewater may also be recycled within the system for further treatment. The odor control composition or compounds may be dosed anywhere within the system, such as upstream or downstream of one or more unit operations. Some embodiments involve a single dosage point while other embodiments involve multiple dosage points.

In accordance with some embodiments, the wastewater treatment system can include one or more sensors for measuring at least one property or operating condition of the system, such as sensors for measuring ORP, BOD, pH, temperature, salinity, turbidity, and pressure drop, for example, at different points in the system thus enabling monitoring for system control, maintenance and/or optimization. Alternatively, rather than requiring any electronic or electro-mechanical sensors, the measurement of various characteristics could alternatively be based upon the senses of an operator. As discussed herein, addition of one or more compounds to the system may be controlled based on one or more detected operating conditions or parameters. One or more parameters may also be adjusted to facilitate odor control, for example, to promote synergy between components of an odor control composition dosed to a treatment system.

In accordance with one or more embodiments, the wastewater treatment system can also include one ore more controllers for adjusting or regulating at least one operating parameter of the system or a component of the system, such as, but not limited to, actuating valves and pumps. The controller may be capable of monitoring and regulating the operating conditions of the wastewater treatment system including its components. The controller may be in communication with one or more sensors. The controller is typically a microprocessor-based device, such as a programmable logic controller (PLC) or a distributed control system, that receives and/or sends input and output signals to and from components of the wastewater treatment system. The controller may regulate the flow rate of streams within the wastewater treatment system. In some embodiments, the controller may control and/or adjust the addition of an odor control composition or one or more odor control compounds to the system.

In accordance with one or more embodiments and referring to FIG. 1, a representative wastewater treatment system 100 may treat wastewater received from a source (not shown). In some embodiments, this source can consist of municipal waste. Wastewater may be fed to a series of lift stations 120, 130, 140, 150, 160 which all feed wastewater to the water treatment facility 110. Some lift stations, such as lift stations 120, 130, 140 and 160 may receive wastewater directly from municipal sewer lines or other wastewater sources, or may receive wastewater from upstream lift stations (not shown). Other lift stations, such as lift station 150, may receive wastewater from upstream lift stations.

Residence time of the wastewater between lift stations may vary based on the flow rate of wastewater through lift stations and the distance between them. The residence times of wastewater received from lift stations positioned further away from treatment facility 110 are generally longer than the residence times of wastewater received from lift stations in closer proximity to facility 110. The residence times of wastewater between lift stations may vary but in some nonlimiting embodiments may be as long as 15 hours, 24 hours, 48 hours or more. The residence time of wastewater within the facility 110 may generally be based on the design of the system and amount of wastewater received from a source. The flow rate of wastewater in each lift station may vary by site-specific specifications and design. Some lift stations may process as little or less than 0.200 million gallons per day (MGD) of wastewater whereas other lift stations may process more than 5.5 MGD of wastewater. In some embodiments, wastewater treatment facility 110 may treat more than 7.0 MGD of wastewater. Wastewater treatment facility 110 is generally designed to treat and/or remove undesirable waste constituents from the wastewater received from system 100.

Undesirable constituents present in the wastewater may include inorganic or organic compounds that may participate or be involved in the metabolism of a microorganism. For example, the wastewater may contain sulfate. Sulfate is a naturally occurring substance present in most well water supplies, dissolved naturally therein through geologic contact. Wastewater generally contains, among other constituents, sulfate as well as a mixed population of bacteria. The bacteria consume the inorganic and organic compounds in the wastewater to obtain the energy and nutrients needed to reproduce. Sulfate is a particularly undesirable constituent in waste because when bacteria consume it, they produce hydrogen sulfide. Humans can sense hydrogen sulfide at levels as low as about 1 ppb in air. Hydrogen sulfide is particularly offensive in concentrations near about 10 ppm and can cause respiratory paralysis if in excess of about 1000 ppm. Communities generally set threshold values for the atmospheric concentration of hydrogen sulfide. Wastewater treatment facilities such as system 100 must treat the wastewater to ensure the atmospheric concentration of hydrogen sulfide is below the set threshold. In some nonlimiting embodiments, a threshold atmospheric hydrogen sulfide level may be in the range of about 0 to 100 ppm. For example, a threshold value may be in the range of about 0 to 50 ppm. In some specific embodiments, a threshold value may be in the range of about 0 to 10 ppm. In other specific embodiments, a threshold atmospheric hydrogen sulfide value may be in the range of about 0 to 5 ppm.

One or more embodiments relate to a method of facilitating odor control in a wastewater treatment system. The method may involve determining the presence of at least one odorous compound in a wastewater system and monitoring the presence of odor in a portion of the system. An odor control composition can be added to the system at any point upstream of where odor is being monitored to effectively reduce or maintain downstream odor below a threshold value. An odor control composition added to the system can more effectively reduce downstream odors than conventional odor control compositions in accordance with one or more embodiments. In some embodiments, synergy between components of an odor control composition may facilitate efficient odor control.

As discussed, bacterial respiration of sulfate is a significant contributing factor to odor in wastewater. Bacteria present in wastewater will respire by preferentially consuming compounds that provide them with the greatest amount of energy. The amount of energy a compound provides is related to its reduction potential. Thus, bacteria preferentially consume compounds that are greater terminal electron acceptors. The representation below generally characterizes the most commonly used terminal electron acceptors, include sulfate, $SO_4^{-2}$, in their preferred order of consumption.

$$O_2 > NO_3^- > Fe^{+3} > SO_4^{-2} > CO_3^{-2}$$

The bacteria generally present in wastewater consume terminal electron receptors to generate energy but this process does not provide nutrients. In order to live and reproduce, the bacteria must also have a source of nutrients available. Municipal sewage and other wastewater systems are rich in organic matter. In these nutrient loaded systems, biological activity can result in a rapid and total consumption of any and all oxygen present in the wastewater. After the bacteria have consumed oxygen present, they then may reduce another available terminal electron acceptor. Nitrate and iron are not typically found in natural waters. Sulfate is thus generally the next preferred available terminal electron receptor. Unless preferred terminal electron receptors are added to supplement the wastewater, bacteria capable of utilizing sulfate in their respiration process will reduce sulfate to hydrogen sulfide by metabolizing the sulfate and organic matter in the wastewater according to the following general equation:

$$SO_4^{-2} + \text{organic matter} + \text{sulfate reducing bacteria} \rightarrow H_2S + CO_2 + H_2O$$

Because wastewater is also rich in both sulfates and organic matter, bacterial population in wastewater tends to increase over time. Wastewater can travel for days through a wastewater treatment system before it is treated. These long residence times enable the bacterial population to grow, which in turn leads to more bacterial respiration of sulfate and the production of odiferous hydrogen sulfide in downstream portions of a treatment facility. The wastewater must be treated such that the hydrogen sulfide emanating from the wastewater treatment system does not exceed a threshold value.

Without wishing to be bound by any particular theory, there are different mechanisms by which hydrogen sulfide can be controlled. In a sulfide reduction mechanism, a chemical that reacts directly with hydrogen sulfide and reduced sulfides may be introduced into a process stream of a wastewater treatment system to reduce existing sulfide levels. This method of odor control may occur by way of a chemical reaction that progresses on a rapid time scale. Compounds capable of facilitating this mechanism may generally be referred to as sulfide-consuming compounds or sulfide-reducing compounds and may generally act rapidly. These compounds may or may not react with other compounds in the sewage. Because they may react relatively quickly with present hydrogen sulfide, they generally may not have long residence times in wastewater. This may largely be referred to as a predominantly chemical mechanism.

In yet another mechanism, such as a sulfide prevention mechanism, a chemical may be introduced into a process stream of the treatment system that has no immediate or short term effect on hydrogen sulfide but instead may alter the metabolic pathway of bacteria present in the wastewater. In this method, the odor control chemical may inhibit bacteria from reducing sulfate present in the wastewater by providing an alternative metabolic pathway. Such compounds may be favored over sulfate by the bacteria and therefore may be preferentially reduced. In contrast to compounds used for sulfide reduction or consumption, preventative compounds may have longer residence times when dosed to wastewater. These chemicals may remain present in the treatment system for an amount of time sufficient to control longer term biogenic production of hydrogen sulfide. This may largely be referred to as a biochemical mechanism.

Because of their relatively short residence time, chemicals that reduce or consume sulfide levels may generally be inefficient at controlling downstream odor. Furthermore, these compounds may generally be more hazardous and more expensive than slower-acting, sulfide prevention compounds. Sulfide reducing chemicals are therefore generally only dosed at points where the goal is to reduce sulfides at the dosage point. They are not dosed to systems to control odor downstream from the dosage point.

In accordance with one or more embodiments, an odor control composition may include a compound that reduces or consumes sulfide, as well as a compound that prevents sulfide formation. In some nonlimiting embodiments, such a composition may include a chlorite material and a nitrate material. In theory, a fixed amount of a composition including these two components should be less effective at reducing downstream odor than using the same fixed amount of the nitrate component alone. Bacteria preferentially reduce nitrate over sulfate. Therefore, the addition of a nitrate to wastewater may generally control odor by altering the metabolic pathways of bacteria. Chlorite is not preferentially respired by bacteria. Instead, it may act as a rapid-acting sulfide consuming chemical that has a relatively short residence time in wastewater. It may therefore generally be considered useful in removing existing odiferous sulfides from wastewater and not in the long term, downstream, prevention of hydrogen sulfide. By reducing the amount of the nitrate component in an odor control composition in favor of chlorite addition, more total odor control composition should be required to reduce downstream odor to below a threshold than would be required if the odor control composition included only the nitrate component.

One or more embodiments recognize an unexpected synergy between nitrate or like component and chlorite or like component for odor control. A synergistic odor control composition may have a superior effect in comparison to the sum of the contributions attributable to individual components of the odor control composition when used alone. In accordance with one or more embodiments, methods of facilitating and/or controlling odor may take advantage of such synergy. A sulfide reducing agent and a sulfide preventing agent may be dosed to a process stream to reduce downstream odor below a threshold value. They may be dosed together as a single odor control composition anywhere at one or more dosage points within the treatment system, or may be dosed separately either at a single dosage point or at different dosage points in the system. In one or more embodiments, less total chemical may beneficially and surprisingly be required to reduce downstream odor to below the threshold value when nitrate and chlorite are used in conjunction rather than alone. In other embodiments, using the same amount of the synergistic blend as would be used if the individual components acted alone may result in a higher level of odor control. In some embodiments, a synergistic blend may be dosed in an amount less than an amount of composition that would be required to reduce the sulfide level to below a threshold value if each component acted as it does when added alone. A weighted average may be generally representative of the amount of composition that would be required if each component acted alone rather than synergistically. In some embodiments, an odor control composition may be added in an amount less than such a weighted average.

In accordance with one or more embodiments, instructions may be provided to add an odor control composition including first and second components to a process stream at a dosage that is less than an amount of the first and second components that would be required to reduce a sulfide level to below a threshold value if they each acted alone. In accordance with one or more embodiments, instructions may be provided to add an odor control composition including first and second components to a process stream at a dosage that is less than a weighted average of the amount of first component and the amount of second component that would be required to reduce a sulfide level to below a threshold value if each acted alone.

In accordance with one or more embodiments, a sulfide reducing agent may be, for example, an iron salt, a hypochlorite, a permanganate, a persulfate, a perborate, a periodate, a percarbonate, a chlorite, a nitrite, a chlorate, a perchlorate and a peroxide of ammonium, and metals or alkali metals A sulfide preventing agent may be ammonium, alkalis, alkaline metals, or nitrates. Other sulfide reducing and preventing agents will be readily selected by those of skill in the art.

In accordance with one or more specific nonlimiting embodiments, two components may be dosed for odor control. Both components may generally be oxidizers and both may generally be sulfide reducing agents. A first component may be an agent via a biochemical mechanism, and a second component may be an agent via a predominantly chemical mechanism. The first component may be a nitrate compound, and the second component may be a chlorite compound. The composition may be used in an amount less than that which would be required to reduce sulfide levels to below a threshold value if each component acted as would be expected if added alone. Dosage may also be impacted by factors including oxygen demand, temperature, pH and other factors.

In accordance with one or more embodiments, odor may be monitored in association with a wastewater treatment facility, such as at an outlet of the facility. A sulfide reducing agent and a sulfide preventing agent can be dosed anywhere upstream of the monitoring point. They may be dosed at an inlet to the facility or at one or more intermediate points between the inlet and the outlet. They may be strategically dosed. The sulfide reducing agent and the sulfide preventing agent can be dosed at different points or at the same point. The sulfide reducing agent and the sulfide preventing agent can be blended together before dosing to form a single odor control composition. They therefore can be dosed from a single source. Alternatively, the odor control composition can be dosed from two distinct sources if the components are not mixed prior to dosing.

One indicator of general odor control efficacy may be the amount of electrons an odor control composition is capable of accepting. As discussed, the amount of electrons certain compounds are capable of accepting may impact the metabolic pathways of bacteria present in wastewater. This may be considered a sulfide preventing method of odor control. The more electrons a terminal electron acceptor compound can receive, the better it will be at preventing sulfide formation. Furthermore, certain compounds capable of accepting electrons can oxidize existing hydrogen sulfide to reduce odor. This may be considered a sulfide reducing method of odor control. The more electrons a compound can accept, the more sulfide the compound can oxidize to an innocuous state. The amount of electrons an odor control composition is capable of accepting may therefore be generally indicative of its overall ability to control odor, regardless of the mechanism by which it operates.

One or more embodiments are directed to a method of controlling odor by treating a wastewater system with an odor control composition comprising a sulfide preventing agent and a sulfide reducing agent that accepts less electrons per gallon than the sulfide preventing agent alone. The odor control composition comprising the reducing and preventing agents, such as nitrate and chlorite, can surprisingly be added in a quantity less than the corresponding quantity of sulfide preventing agent alone required to reduce downstream odor to below a threshold value. In this way, substantially the same level of control can be achieved with less total chemical. Likewise, using an amount of the synergistic blend equivalent to the amount of sulfide preventing agent required alone may result in superior odor control. In some embodiments, the sulfide preventing agent can be a nitrate, and the sulfide reducing agent can be an oxidizer, such as chlorite.

Nitrate is generally capable of accepting five electrons per nitrogen atom. This is demonstrated by the following half-reaction:

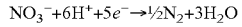

$NO_3^- + 6H^+ + 5e^- \rightarrow \frac{1}{2}N_2 + 3H_2O$

Chlorite is an oxidizer that can react directly with reduced sulfur compounds. Chlorite accepts four electrons and is reduced to chloride by the following half reaction:

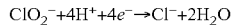

$ClO_2^- + 4H^+ + 4e^- \rightarrow Cl^- + 2H_2O$

Because chlorite is capable of accepting only four electrons and nitrate is capable of accepting five electrons, a composition comprising chlorite and nitrate should be less effective at controlling wastewater odors than an identical amount of a composition containing nitrate alone. In accordance with one or more embodiments, an unexpected and surprising synergism is thus recognized and appreciated.

One or more embodiments involve a method of controlling odor by promoting synergy between a sulfide preventing agent with an oxidizer, wherein the sulfide preventing agent can accept more electrons than the oxidizer. In one or more embodiments, a process stream of a water treatment facility may be treated with an odor control composition comprising a sulfide preventing agent and an oxidizer to reduce odor more effectively than the sulfide preventing agent acting alone. The sulfide preventing agent can be a nitrate and the oxidizer can be a chlorite. Other known sulfide preventing agents and oxidizers will be readily selected by those having ordinary skill in the art. In other embodiments, a higher level of odor control may be achieved using a quantity of the synergistic blend equivalent to a quantity of a sulfide preventing agent that would be used alone. Synergism may be promoted through strategic dosing of the components of the odor control composition, such as based on time and location of closing, as well as through adjustment of one or more conditions associated with the wastewater treatment facility. These may include, but are not limited to, temperature, pH and ORP.

In accordance with one or more embodiments, an odor control composition comprising a sulfide preventing agent and an oxidizer may be dosed to a process stream of a waste treatment facility to reduce downstream sulfide odors below a threshold value. One or more embodiments can involve one or more sensors, such as an ORP sensor, that provide a signal or representation of the measured parameter. One or more embodiments can involve a control system disposed or configured to receive one or more signals from one or more sensors in an odor control system. The control system can further be configured to provide one or more output or control signals to one or more sources of the odor control composition or other components of the system.

In accordance with one or more embodiments, the amount of odor control composition dosed to the system can be optimized to both control odor equivalent to the odor control achieved by a composition consisting only of sulfide preventing compound and reduce the amount of chemical dosed to the system. Further, the dosage point may be selected and/or determined based on the residence time of the wastewater between the dosage point and the point at which odors must be below the threshold and be optimized to produce sufficient odor control using as little chemical as possible. The odor control composition dose and dosage point can also be adjusted and optimized in response to variations in downstream odor resulting from external system factors, including temperature variations, increased or decreased flow of waste, rain water, and other factors that contribute to changes in odor.

In further accordance with one or more of the embodiments disclosed herein, a method is disclosed whereby a chlorite salt and a nitrate salt are used to control downstream sulfide odor better than a nitrate salt alone. In specific, nonlimiting odor control compositions, effective amounts of the chlorite salt may be present in amount of up to about 2%, 3%, 5% or 10% or more, in some preferred embodiments about 2.8% by weight, and the nitrate compound may be present in an amount of 30-70% by weight, with the balance being water. In some embodiments, oxidizer may comprise about 0.1 to about 10 wt. % of the odor control composition. In accordance with one or more nonlimiting embodiments, an odor control composition may include calcium nitrate and sodium chlorite. In some specific embodiments, oxidizer may comprise about 1 wt. % of the odor control composition. In other specific embodiments, oxidizer may comprise about 2.5 wt. % of the odor control composition.

One or more embodiments involve the modification of existing facilities to retrofit one or more systems, or components thereof. Thus, for example, an existing facility can be modified to include a controller executing instructions in accordance with one or more embodiments exemplarily discussed herein. Alternatively, existing control systems can be reprogrammed or otherwise modified to perform any one or more acts. Existing wastewater treatment systems can be converted to wastewater treatment systems in accordance with methods described herein utilizing at least some preexisting equipment such as the shell and wetted parts. Existing facilities that were designed without certain provisions may be retrofitted without requiring significant construction efforts. In some embodiments, an existing treatment facility may be retrofitted to provide a new odor control composition in an amount less than a previous odor control composition used. In other embodiments, a system may be retrofitted to provide a new odor control composition in substantially the same amount than a previous odor control composition to achieve superior results.

The function and advantages of these and other embodiments can be further understood from the examples below, which illustrate the benefits and/or advantages of the one or more systems, methods, and techniques but do not exemplify the full scope of the invention.

EXAMPLE 1

This example describes methods in accordance with one or more embodiments to control downstream odor using an oxidizer and a sulfide preventing agent. This method realized a 10.8% reduction in the odor control chemical cost as compared to the use of sulfide preventing agent alone.

An existing sewerage collection system with lift stations originating along a major thoroughfare was selected as the study site for downstream odor control using a composition including calcium nitrate and sodium chlorite. The collection system treated municipal waste generated by a community. The wastewater treated by the system contained human waste rich in organic matter, sulfates and sulfate reducing bacteria.

The collection system, depicted in FIG. 2 consisted of two master lift stations, MLS 301 and MLS 302, and a number of upstream lift stations, which fed wastewater to a central water treatment facility WTF. Each lift station processed varying quantities of waste, ranging from 0.200 million gallons per day (MGD) to 5.5 MGD. The water treatment facility treated on average 7.0 MGD of wastewater. Wastewater traveling between lift stations had various residence times in the system according to pipe length and flow rate.

The odor control treatment objectives set by the facility were to maintain atmospheric hydrogen sulfide levels at the LS312, MLS 302, and WTF monitoring points below the threshold value of 50 ppm. During Stage 1 of the study, Day 1 until Day 20, the system was treated with a nitrate solution to control downstream odors emanating from the monitoring points. The system was optimized to meet the odor control objective and to reduce overfeed. After optimization, the nitrate salt feed upstream of LS312 averaged 142 GPD. The nitrate salt feed upstream of MLS 302 averaged 537 GPD and the nitrate salt feed upstream of WTF averaged 537 GPD. Odor data was collected from each monitoring point. The nitrate salt feeds and corresponding odor data is reproduced in Table 1 below.

TABLE 1

| Nitrate Salts Feed and Odor Summary Stage 1 (20 days) | | | |
|---|---|---|---|
| | Total Upstream Feed (GPD) | Atmospheric Hydrogen Sulfide (ppm) | Dissolved Sulfide (mg/L) |
| Lift Station 312 | 142 | 15.1 | 10.4 |
| Lift Station 302 | 537 | 16.1 | 9.6 |
| WTF | 537 | 11.2 | 3.7 |

During the following week, the odor control chemical feed and storage tanks were emptied and cleaned. The tanks were then filled with an odor control composition comprising calcium nitrate and sodium chlorite. It was expected that this solution would be less effective at controlling downstream odor than the nitrate alone due to chlorite's short residence time in the wastewater. A chemical analysis of the composition predicted the composition would be 85% as effective as nitrate salts alone.

Following the cleaning, the odor control composition comprising chlorite and nitrate was fed to the dosage points previously dosed with only nitrate salts. In Stage 2, the system was treated with this odor control composition at a constant flow rate for 30 days. During this time period, the average atmospheric temperature at the study site increased by 8° F., or 4.4° C. It is proper to assume a corresponding increase in the wastewater temperature during this time period. The rate of conversion of sulfate to sulfide by sulfate reducing bacteria under increased temperatures can be expressed by the Pomeroy Rule:

$$r_s = M_1 C_{BOD} \Theta^{(T-20)}$$

where $r_s$=Rate of sulfide generation (g/m²-h)

$M_1$=Effective sulfide flux coefficient for sulfide generated (m/h)

$C_{BOD}$=BOD concentration in wastewater mg/L $\Theta$=Temperature coefficient 1.7

The Pomeroy Rule predicts a 7% increase for every degree Celsius rise in temperature. Under the experienced increase in temperature, this model predicts a 31% increase in sulfide production. It must also be noted that at higher temperatures, hydrogen sulfide is more volatile and a greater proportion of the compound is in the gas phase.

Under these conditions, more nitrate salt than dosed in Stage 1 would have been required to comparably control downstream odor. In Stage 2, the nitrate and chlorite composition was experimentally fed at dosages less than 67% of the Stage 1 nitrate salt feeds. The experimental dosages were selected in part to ensure that if effective, there would be significant chemical cost savings. However, at these reduced dosages, it was not expected that the composition could effectively control odor.

Surprisingly, the composition was able to control sulfide levels within the threshold value while still yielding a chemical cost savings. Though atmospheric hydrogen sulfide and dissolved sulfide levels increased, the odor control objective was still met by the composition at the reduced feed rates. Data collected during this time period is summarized in Table 2 below.

TABLE 2

CaNO₃ and NaClO₂ Composition Feed and Odor Summary Stage 2 (30 Days)

|  | Total Feed (GPD) | % Difference from Nitrate Salts | Atmospheric Hydrogen Sulfide (ppm) | % Difference from Nitrate Salts | Dissolved Sulfide (mg/L) | % Difference from Nitrate Salts |
|---|---|---|---|---|---|---|
| Lift Station 312 | 75.6 | 52.3 | 24.9 | 1.65 | 9.5 | 109.47 |
| Lift Station 302 | 356 | 66.3 | 22.5 | 1.4 | 9.3 | 103.22 |
| WRF | 356 | 66.3 | 24.4 | 2.18 | 3.1 | 83.78 |

In the final stage of the field study, Stage 3, the feed rates upstream of Lift Station 312, 302, and the Water Reclamation Facility were further decreased to less than about 60% of the Stage 1 feeds. The further-decreased rates were maintained through the end of the study. During this 20 day time period, the average atmospheric temperature at the facility was 4.6° C. higher than in Stage 1. Sulfide levels were therefore expected to increase from the Stage 1 values by 32.2%. Furthermore, Given that chlorite is rapidly consumed by sulfide, it was not expected that at these further reduced feed rates that the composition could effectively control odor. The data collected from this time period is represented in Table 3.

TABLE 3

CaNO₃ and NaClO₂ Composition Feed and Odor Summary Stage 3 (20 Days)

|  | Total Feed (GPD) | % Difference from Nitrate Salts | Atmospheric Hydrogen Sulfide (ppm) | % Difference from Nitrate Salts | Dissolved Sulfide (mg/L) | % Difference from Nitrate Salts |
|---|---|---|---|---|---|---|
| Lift Station 312 | 71.2 | 50.14 | 30.4 | 201.32 | 11.6 | 111.54 |
| Lift Station 302 | 323 | 60.15 | 14.2 | 88.2 | ND | ND |
| WTF | 276 | 51.4 | 11.8 | 105.36 | 2.4 | 64.86 |

At monitoring point LS312, there was an increase in the average atmospheric concentration of hydrogen sulfide, but levels were still considerably below the target of 50 ppm. Surprisingly, at monitoring point LS302, the hydrogen sulfide concentration decreased from an average of 16.1 ppm to 14.2 ppm.

Thus, the odor control composition dosed to the treatment facility was unexpectedly effective at controlling hydrogen sulfide by using 40% less total product than nitrate salts alone. By using the feeds of Stage 3, the reduced amount of composition dosed to the system achieved an overall savings of 10.8%.

EXAMPLE 2

This example describes a method in accordance with one or more embodiments for odor control using an odor composition capable of accepting less total electrons than the composition traditionally dosed to a sewage collection system. This approach unexpectedly realized a 30% reduction in chemical required for treatment and over a 50% reduction in odor that the treatment traditionally employed at the facility.

An existing sewerage collection system with a series of lift stations originating along a major thoroughfare was selected as the study site for downstream odor control utilizing calcium nitrate and sodium chlorite. The collection system treated municipal waste generated by a community. The wastewater treated by the system contained human waste rich in organic matter, sulfates, and sulfate reducing bacteria.

The odor control treatment objectives set by the facility were to maintain the dissolved sulfide concentrations at LS12 and LS5 below threshold limits. The dissolved sulfide concentration at LS12 had a threshold value of 1 mg/L and the dissolved sulfide concentration at LS5 had a threshold value of 5 mg/L. Treatment of odor at LS 12 and LS5 was historically accomplished by dosing the system with nitrate salts.

As discussed, it has been established that nitrates are effective in the biochemical removal and prevention of reduced sulfur compounds in sewage. Nitrate is conventionally injected into a sewer system in sufficient quantities to biochemically oxidize the sulfide by the following reaction:

$$8NO_3^- + 5H_2S \rightarrow 5SO_4^= + 4N_2 + 4H_2O + 2H^+$$

In this process each nitrate nitrogen is reduced to elemental nitrogen effecting a change in oxidation state of −5, indication that five electrons are accepted per nitrogen atom as other species, reduced sulfides or organic compounds, are oxidized. Likewise, chlorite is an oxidizer that can react with reduced sulfur compounds or organic compounds to form chloride. In the process the chlorine is reduced from an oxidation state of +3 to −1, accepting four electrons. The addition of chlorite salt to nitrate should increase the efficacy for odor control although in theory more of this mixture should be required compared to nitrate compounds exclusively.

A first solution (Solution 1) was used which was essentially a solution of calcium nitrate containing 3.50 pounds of nitrate oxygen per gallon, which equates to 122.4 g nitrate nitrogen per liter, or 8.75 moles nitrate nitrogen per liter. Since the conversion of nitrate nitrogen to elemental nitrogen accepts 5 electrons, one liter of Solution 1 accepts 43.7 moles of electrons.

Sodium chlorite accepts four electrons per chlorite ion, or 4.0 moles of electrons per mole of sodium chlorite. Since one mole of sodium chlorite masses 91.44 grams, this amounts to 0.0437 moles of electrons per gram.

A second solution (Solution 2) was also used which incorporates both calcium nitrate and sodium chlorite. One of its configurations has a concentration of 2.84 pounds of nitrate oxygen per gallon and was 2.5% sodium chlorite. The density of the referenced solution is 1.404 g/mL. Thus, the nitrate in this solution is expected to accept 43.7*2.84/3.50 or 35.5 moles of electrons per liter. Since the solution is 2.5% sodium chlorite with a density of 1.404 g/mL, it would contain 35.1 grams of sodium chlorite capable of accepting 35.1*0.0437 or 1.53 moles of electrons per liter. Thus a liter of this formulation of Solution 2 would be expected to accept 35.5+1.5 or 37.0 moles of electrons.

Thus if the nitrate and chlorite act independently it is reasonable to expect this formulation of Solution 2 to require 43.7/37.0 or 1.18 times the volume of Solution 1, a pure nitrate containing compound to control the same amount of odor in a sewer.

Lift Station 15 and Lift Station 12 at a municipal test site were converted from Solution 1 to the above formulation of Solution 2.

Lift Station 15 (LS15) is upstream of Lift Station 12 (LS12) which is the monitoring point for treatment at LS15. The required concentration of dissolved sulfide at LS12 must be less than 1 mg/L. Likewise the feed effectiveness at LS 12 is measured downstream at Lift Station 5 where the required dissolved sulfide must be less than 5 mg/L.

For a period of approximately 106 days, Solution 1 was fed at both lift stations and the systems were optimized to meet the dissolved sulfide goals without overfeed chemical. During that period the average feed of Solution 1 at LS 15 was 29.9 gallons per day (GPD) giving a dissolved sulfide at LS12 of 0.40 mg/L and an average atmospheric hydrogen sulfide in the wet well of 21.6 ppm. During the same period an average of 28.1 GPD of Solution 1 was fed at LS 12 and at LS5 the average dissolved sulfide was 2.1 mg/L with an atmospheric hydrogen sulfide leaving the wet well of 28.5 ppm.

After this test period, the odor control chemical was changed from Solution 1 to Solution 2. Initially the same feed rate was maintained, but within a few days it was obvious that less chemical was required. The system was optimized and then operated at the new feed rates.

For a period of approximately 173 days, the system operated with Solution 2. The average feed at LS 15 was 21.0 GPD with the LS 12 dissolved sulfide concentration of 0.25 mg/L and atmospheric hydrogen sulfide concentration of 13.3 ppm. Likewise at LS 12 the average feed was 20.5 GPD and at LS 5 the average dissolved sulfide concentration was 1.9 mg/l and an atmospheric hydrogen sulfide concentration of 13.2 ppm.

Strict consideration of oxidation/reduction indicates that a greater volume of Solution 2 would be required for odor control by a factor of 1.18. Yet empirical data has shown that in at least two applications, the required quantity was less, in the first case by 30% and in the other case by 27%, while giving better odor control than the Solution 1 as evidenced by the lower concentrations of both dissolved sulfide and hydrogen sulfide vapor. (See Table 4 below.)

During the three month period of Stage 1, nitrate salts were fed upstream of both lift stations to meet the dissolved sulfide goals. The system was optimized to ensure there was no chemical overfeed. The average feed of nitrate salts upstream of LS 12 was 29.9 GPD, which resulted in a sulfide concentration of 0.40 mg/L and an average atmospheric hydrogen sulfide concentration of 21.6 ppm. During this same time period, 28.1 GPD nitrate salts were fed upstream of LS5, which resulted in dissolved sulfide concentration of 2.1 mg/L and an atmospheric hydrogen sulfide concentration of 28.5 ppm.

In Stage 2, the odor control chemical was changed from pure nitrate salts to a mix of nitrate and chlorite salts comprising 25 wt. % chlorite. Initially, the composition was fed at the Stage 1 feed rates. Days into Stage 2, however, the concentrations of atmospheric hydrogen sulfide and dissolved sulfides fell well below the Stage 1 concentrations. The system was optimized to reduce chemical overfeed. The system was treated with the Stage 2 composition at the reduced chemical feed rates for a period of six months.

The feed of odor control composition upstream of LS12 was reduced by 29.8%. Even with the reduced feed, the downstream atmospheric hydrogen sulfide concentration surprisingly and unexpectedly decreased by 38.4%. The odor control chemical feed rate upstream of LS5 was reduced by 27%. Even with the reduced feed, the atmospheric hydrogen sulfide concentration at LS5 was surprisingly reduced by 53.7%. The reduced chemical feed required to treat the system yielded an overall chemical savings of 30% and provided significantly better odor control.

It was unexpectedly found that using a combination of nitrate and chlorite together is more effective for control of hydrogen sulfide than would be expected from the sum of their individual effects.

Although the example shows for instance the chemical combination of calcium nitrate and sodium chlorite, the invention is not limited to these compounds. Any nitrate and chlorite containing compound can be utilized. Other preventative compounds and other oxidizers may also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

TABLE 4

|  | Average Upstream Feed Rate to LS12 (GPD) | Average Dissolved H2S at LS12 (mg/L) | Average Atmospheric Hydrogen Sulfide at LS12 (ppm) | Average Upstream Feed rate to LS5 (GPD) | Average Dissolved Sulfide at LS5 (mg/L) | Average Atmospheric Hydrogen Sulfide at LS5 (ppm) |
|---|---|---|---|---|---|---|
| Nitrate Salts Stage 1 | 29.9 | 0.4 | 21.6 | 28.1 | 2.1 | 28.5 |
| Nitrate & Chlorite Salts Stage 2 | 21 | 0.25 | 13.3 | 20.5 | 1.9 | 13.2 |
| Percent Difference | 29.8 | 37.5 | 38.4 | 27 | 9.5 | 53.7 |

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of controlling odor in a water treatment system, comprising:
    introducing a process stream at an inlet of the water treatment system;
    measuring a sulfide level at an outlet of the water treatment system;
    selecting an odor control composition comprising a sulfide-reducing agent and an oxidizer, the oxidizer comprising about 0.1 to about 10 wt. % of the odor control composition; and
    reducing the sulfide level measured at the outlet to below a threshold value by adding the selected odor control composition to the process stream at a dosage less than that which would be required if the sulfide-reducing agent and the oxidizer were acting alone.

2. The method of claim 1, wherein the sulfide-reducing agent comprises a nitrate compound.

3. The method of claim 2, wherein the sulfide-reducing agent comprises calcium nitrate.

4. The method of claim 2, wherein the oxidizer comprises a chlorite compound.

5. The method of claim 4, wherein the oxidizer comprises sodium chlorite.

6. The method of claim 1, wherein the oxidizer comprises about 1 to about 2.5 wt. % of the odor control composition.

7. The method of claim 1, wherein the odor control composition further comprises a pH elevating compound.

8. The method of claim 1, wherein the sulfide-reducing agent and the oxidizer are added separately to the process stream.

9. The method of claim 8, wherein the sulfide-reducing agent and the oxidizer are added to the process stream at different dosage points within the water treatment system.

10. The method of claim 1, further comprising adjusting the amount of the odor control composition that is added to the process stream.

11. The method of claim 1, wherein the threshold value is an atmospheric hydrogen sulfide level of less than about 50 ppm.

* * * * *